US011764895B2

United States Patent
Sharp et al.

(10) Patent No.: US 11,764,895 B2
(45) Date of Patent: *Sep. 19, 2023

(54) WIRELESS COMMUNICATION SYSTEM WITH DETECTORS FOR EXTRANEOUS RECEIVED SIGNALS

(71) Applicant: OCADO INNOVATION LIMITED, Hatfield (GB)

(72) Inventors: David Sharp, Hatfield (GB); Amy Stephens, Hatfield (GB); Montague Fraser Barlow, Hatfield (GB); Adam Nikolai Green, Hatfield (GB); Fraser Murray Edwards, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 122 days.

This patent is subject to a terminal disclaimer.

(21) Appl. No.: 17/342,939

(22) Filed: Jun. 9, 2021

(65) Prior Publication Data
US 2021/0328706 A1 Oct. 21, 2021

Related U.S. Application Data

(63) Continuation of application No. 16/476,505, filed as application No. PCT/EP2017/084485 on Dec. 22, 2017, now Pat. No. 11,063,687.

(30) Foreign Application Priority Data

Jan. 8, 2017 (GB) ...................................... 1700286

(51) Int. Cl.
*H04K 3/00* (2006.01)
*G01S 7/02* (2006.01)
(Continued)

(52) U.S. Cl.
CPC .............. *H04K 3/822* (2013.01); *G01S 7/021* (2013.01); *H04K 3/226* (2013.01); *H04W 16/14* (2013.01);
(Continued)

(58) Field of Classification Search
CPC .... H04K 3/822; H04K 3/226; H04K 2203/18; G01S 7/021; H04W 16/14; H04W 72/542; H04W 28/16; H04W 72/541
See application file for complete search history.

(56) References Cited

U.S. PATENT DOCUMENTS 5,148,548 A * 9/1992 Meche ................ H04W 72/082
455/452.2
5,603,082 A 2/1997 Hamabe
(Continued)

FOREIGN PATENT DOCUMENTS

CN 1930899 A 3/2007
EP 1443706 A1 8/2004
(Continued)

OTHER PUBLICATIONS

First Office Action dated Oct. 8, 2022, by the Chinese Patent Office in corresponding Chinese Patent Application No. 201780084438.4, and an English Translation of the Office Action. (11 pages).
(Continued)

*Primary Examiner* — Steven H Nguyen
(74) *Attorney, Agent, or Firm* — BUCHANAN INGERSOLL & ROONEY PC

(57) ABSTRACT

A wireless communication system having base stations, remotely located terminal units and a base station controller. The base stations and the remotely located terminal units communicate data over operational wireless communication links between them. The base stations include respective in-channel detectors and out-of-channel detectors for detect-
(Continued)

ing radar or other extraneous received signals. The in-channel detectors analyse signals over the operational communication links. The out-of-channel detectors include respective out-of-channel receiver elements that monitor possibly available channels alternative to the respective operational communication link channels. The base station controller registers whether channels are available or not for communication links, and allocates to the base stations respective target channel parameters including frequencies available for operational and alternative communication links. The base stations store the respective target channel parameters for available operational and alternative communication links.

17 Claims, 5 Drawing Sheets

(51) Int. Cl.
*H04W 16/14* (2009.01)
*H04W 72/542* (2023.01)
(52) U.S. Cl.
CPC ...... *H04W 72/542* (2023.01); *H04K 2203/18* (2013.01)

(56) References Cited

U.S. PATENT DOCUMENTS

| | | |
|---|---|---|
| 6,377,548 B1 | 4/2002 | Chuah |
| 6,418,317 B1 | 7/2002 | Cuffaro et al. |
| 6,741,839 B1 | 5/2004 | Bednekoff |
| 8,204,004 B2 | 6/2012 | Hamamoto et al. |
| 11,063,687 B2 * | 7/2021 | Sharp .................. H04W 72/085 |
| 2004/0156336 A1 | 8/2004 | Mcfarland et al. |
| 2005/0215266 A1 | 9/2005 | Tsien et al. |
| 2006/0135191 A1 | 6/2006 | Matsui et al. |
| 2007/0287464 A1 | 12/2007 | Hamamoto et al. |
| 2008/0165754 A1 | 7/2008 | Hu |
| 2011/0096739 A1 | 4/2011 | Heidari et al. |
| 2012/0300811 A1 | 11/2012 | Hu |
| 2017/0041949 A1 | 2/2017 | Ngo et al. |
| 2019/0356408 A1 | 11/2019 | Sharp et al. |

FOREIGN PATENT DOCUMENTS

| | | | |
|---|---|---|---|
| EP | 1732338 A1 | 12/2006 | |
| EP | 3128779 A1 | 2/2017 | |
| EP | 3366052 A1 | 8/2018 | |
| GB | 2498824 A | 7/2013 | |
| GB | 2529029 A | 2/2016 | |
| WO | 03001742 A1 | 1/2003 | |
| WO | WO-03001742 A1 * | 1/2003 | ............ H04W 16/14 |
| WO | 2016003862 A1 | 1/2016 | |
| WO | 2017070099 A1 | 4/2017 | |

OTHER PUBLICATIONS

Office Action dated Sep. 9, 2022, by the Canadian Patent Office in corresponding Canadian Patent Application No. 3,049,151. (3 pages).
Office Action (Communication) dated Nov. 17, 2021, by the European Patent Office in corresponding European Patent Application No. 17818590.6. (7 pages).
Office Action dated Oct. 19, 2021, by the Canadian Patent Office in corresponding Canadian Patent Application No. 3,049,151. (3 pages).
International Search Report and Written Opinion issued in corresponding International Patent Application No. PCT/EP2017/084485, 18 pages (dated Mar. 20, 2018).
Kerry S.J. et al., "Liaison statement on the compatibility between IEEE 802.IIa and radars in the Radiolocation and Radionavigation service in the 5250-5350 MHz and 5470-5725 MHz bands," URL:http://www.ieee802.org/Regulatory/Meeting documents/2001 Jan/1081r28R-Liaison-Between-IEEE802.11-and-RADARs-in-Radiolocation-and-Radioavigation.pdf, (Jan. 17, 2001).
Office Action (Communication) dated Aug. 16, 2019, by the European Patent Office in corresponding European Patent Application No. 17818590.6. (3 pages).
Office Action (Communication) dated Nov. 4, 2020, by the European Patent Office in corresponding European Patent Application No. 17818590.6, (8 pages).
Office Action dated Apr. 29, 2020, by the Great Britain Patent Office in corresponding Great Britain Patent Application No. GB1700286.6, (6 pages).
Office Action dated Apr. 29, 2020, by the Great Britain Patent Office in corresponding Great Britain Patent Application No. GB1700286.6, (8 pages).
Office Action dated May 15, 2019, by the Great Britain Patent Office in corresponding Great Britain Patent Application No. GB1700286.6, (7 pages).
Office Action dated Jun. 7, 2017, by the Great Britain Patent Office in corresponding Great Britain Patent Application No. GB1700286.6, (9 pages).
Office Action dated Nov. 22, 2019, by the Great Britain Patent Office in corresponding Great Britain Patent Application No. GB1700286.6, (4 pages).
Office Action (Examination report No. 1 for standard patent application) dated Feb. 1, 2023, by the Australian Government, IP Australia in corresponding Australian Patent Application No. 2022200721. (2 pages).
Second Office Action dated Apr. 1, 2023, by the Chinese Patent Office in corresponding Chinese Patent Application No. 201780084438.4, and an English Translation of the Office Action. (7 pages).
Office Action dated May 26, 2023, by the Canadian Patent Office in corresponding Canadian Patent Application No. 3,049,151. (3 pages).

* cited by examiner

WIRELESS COMMUNICATION SYSTEM WITH DETECTORS FOR EXTRANEOUS RECEIVED SIGNALS

FIELD OF THE INVENTION

This invention relates to a wireless communication system with detectors for extraneous received signals.

Wireless communication refers to communication of data using modulated electromagnetic radiation through a non-solid medium. The term does not imply that the associated devices do not contain any wires. Wireless communications may be utilized in conjunction with wired communications.

BACKGROUND OF THE INVENTION

Various techniques to allocate spectrum usage, in various dimensions, such as time, frequency, and the ability to combine/separate signals may be employed to use limited spectrum bandwidth more efficiently, with a protocol for sharing, allocating and reusing the spectrum bandwidth.

These protocols may also be designed with consideration for a number of environmental factors, and may also be scalable given that these protocols are often used in conjunction with dynamic systems where the number of devices may vary over time, and communication needs may also vary over time. For example, devices may enter the network, leave the network, record data, send updates, receive configuration files, and receive instructions. Further issues may include the density of the devices within a physical area and the need for simultaneous communications.

Environmental factors may include, for example, issues with spectral noise, interference, signal degradation, wave absorption/blocking/reflection, multipath fading, and limited availability of spectrum.

Furthermore, in systems where there may be a large number of devices, the system may be designed, for example, to account for devices joining and exiting the network, allocation and resizing of various transmission pathways needed by various devices, broadcasting messages across a number of devices, accounting for devices malfunctioning or otherwise being out of communication, and redundancy requirements.

Typically a radio (or wireless) local area network (RLAN) has one or more base stations (or access points), a plurality of remotely located terminal units (or user equipment) transmitting and receiving data over operational wireless communication links, and a base station controller that controls channel parameters used by the base stations for the respective communication links. The term base station is used herein to refer to a wireless communications station installed usually at a fixed location and used for wireless communication with terminal units, which may be mobile. The base stations may communicate also over wired or wireless communication links with other base stations and one or more base station controllers. The terminal units may also communicate directly with each other in some configurations without the communication passing through a base station or a base station controller.

Our Patent Specification GB2529029 describes use of RLANs in various applications. One such application is in an automatic or semi-automatic warehouse facility with robots including RLAN communication terminal units. Movements of the robots may be enabled across various paths, some of which may intersect. The warehouse facility may include bins arranged for example in a grid-like structure, where robots move to place objects in and pick objects from the bins. The RLAN may also include other mobile, non-robot terminal units, for example communication terminal units carried by human beings. The facility includes a robot control system with real-time or near real-time wireless communication between the robot control system, the base stations and the terminal units. The robot control system controls the navigation/routing of robots, including, but not limited to, moving from one location to another, collision avoidance, optimization of movement paths, control of activities to be performed. The base station controller controls parameters of the communication links, rather than the content of the communications.

Many other applications of the RLANs are described in Patent Specification GB2529029, for example the terminal units collecting data including operational data, performance data, analytic metrics related to operations of the system, storing and transmitting metrics regarding route planning or obstacles on a map, such intelligence being processed at a base station, or a central server, and decisions distributed to the terminals on the network. Information gathered may be utilized to map various properties of terminals over a period of time. For example, the flow of people using terminal units in the form of wearable devices, such as wristbands may be mapped as they move around a location, which may be useful for determining bottlenecks in the movement of people in subway stations, or the flow of people in a music festival or an exhibition space, for example. The terminals may be utilized to provide voting capabilities to one or more people and sent individually to the base stations, and/or the votes aggregated together by various terminals and then sent up in aggregate to the base stations. Voting may be used in various contexts and applications, for example, voting at a game show, voting at a concert, voting for political parties.

There are various communication technologies/protocols available, such as the IEEE 802.11/Wi-Fi™ standards, and wireless cellular communications (2G, 3G, Universal Mobile Telecommunications System (UMTS), Long-Term Evolution (LTE), for example. A challenge common to the different technologies of wireless networks when providing effective and consistent communication is limited spectrum bandwidth. Spectrum is limited both by natural constraints such as interference by transmissions from neighbouring devices or by noise and also by legal/regulatory requirements. For example certain bands of frequency are highly regulated and are allocated to, or prioritise particular uses. An example of such restrictions apply in the frequency range of 5470-5725 MHz that permit unlicensed transmissions but require detection and avoidance of interference with radar signals. Further, these RLANs may use frequency bands that are also used by other types of devices for communications or other uses causing external traffic and noise interference, exacerbated by undesirable signal characteristics such as attenuation when penetrating walls or other solids, lack of bandwidth, low bit rate, antenna size, transmission power, and beam density.

In order to improve functioning, and in certain frequency ranges to ensure compliance with regulatory requirements, RLANs can use techniques of changing the channel parameters, especially the frequencies used for the communication links. For this purpose, the RLAN system may include detectors for detecting extraneous received signals such as interference by noise, or by signals (such as radar) to which compliance with the regulations requires reaction, and change the channel parameters including the frequencies to avoid the interference. One conventional technique of detection of extraneous received signals and changing the channel parameters including the frequencies is referred to as dynamic frequency selection (DFS). Autonomous reaction by the different base stations would cause complications unless suitable precautions are taken for allocation of the channel parameters used by the base stations for the respective communication links. Moreover, if the transmissions are interrupted or the interference of the receptions continues while the channel parameters are changed, the time delay may be prohibitive especially if the procedure for checking and implementing the target channel parameters is prolonged.

A wireless communication system enabling prompt reaction to detection of extraneous received signals with minimal disturbance to communication links is desirable.

SUMMARY

Some embodiments of the present disclosure provide a wireless communication system comprising a plurality of base stations, a plurality of remotely located terminal units and at least one base station controller. The base stations and the remotely located terminal units comprise respective communication modules for transmitting and receiving data over operational wireless communication links between at least the base stations and the terminal units. The communication modules include respective in-channel receiver elements for signals received over the operational communication links. The base station controller controls channel parameters used by the base stations for the respective communication links, the channel parameters including allocations of frequencies for use in the communication links. At least a plurality of base stations include respective in-channel detectors and out-of-channel detectors for detecting extraneous received signals. The in-channel detectors analyse signals from the communication modules in the base stations received over operational communication links. The out-of-channel detectors include respective out-of-channel receiver elements that monitor possibly available channels alternative to the respective operational communication link channels for detecting extraneous received signals. The base station controller receives reports of detection of extraneous received signals from the in-channel detectors and out-of-channel detectors, registers whether channels are available or not for communication links, and allocates to the base stations respective target channel parameters including frequencies available for operational and alternative communication links. The base stations store the respective target channel parameters that have been checked successfully to be available for alternative communication links. The base stations change channel parameters used for the respective operational communication links as a function of the stored target channel parameters without further previous availability checking of the alternative communication link channel. Examples of extraneous received signals include noise, interference from adjacent communication devices, or non-communication signals such as radar that require reaction as well as causing noise.

Exemplary embodiments of present disclosure also includes a base station and a base station controller for use in such a wireless communication system.

Some embodiments of the present disclosure provide a base station for a wireless communications system comprising one or more of the base stations, and a plurality of remotely located terminal units. The base stations and the remotely located terminal units comprise respective communication modules for transmitting and receiving data over operational wireless communication links between at least the base stations and the terminal units. The communication modules include respective in-channel receiver elements for signals received over the operational communication links. The base station includes at least one in-channel detector and at least one out-of-channel detector for detecting extraneous received signals. The in-channel detector analyses signals from the communication modules in the base station received over channels corresponding to respective operational communication links for detecting extraneous received signals. The out-of-channel detector includes out-of-channel receiver elements that monitor possibly available channels alternative to the respective operational communication link channels for detecting extraneous received signals. The base station stores respective target channel parameters including frequencies available for operational and alternative communication links.

If the base stations stored lists of back-up channels for use in the event of detection of in-channel extraneous received signals without prior availability checking, the availability would have to be checked before the base stations could use them as alternative operational channels. Such an availability check can take a long time, during which the transmissions may need to be interrupted or the interference of reception is problematic. Monitoring in-channel and out-of-channel extraneous signals in several (or all) the base stations enables a large number of channels to be monitored without overloading any one base station, and offers geographical distribution of the monitoring. The use of specific receiver elements tuned to a different channel from the operational channel for out-of-channel monitoring can avoid interrupting transmission and reception of data by the base station while monitoring possible alternative channels for extraneous received signals.

The base stations may change channel parameters for the operational communication links to the stored channel parameters for the alternative communication links on detection of in-channel extraneous received signals. The base stations may change channel parameters for the operational communication links in response to the respective in-channel detector detecting extraneous received signals and to the base station controller changing allocations of frequency for the respective base stations as a function of a report from a different base station. The base stations may use dynamic frequency selection techniques to change channel parameters for the operational communication links. The in-channel detectors and out-of-channel detectors may detect reception of radar signals as the extraneous received signals and the dynamic frequency selection techniques may be utilised for radar detection and avoidance.

The base stations as master units may control the channel parameters for the communication links with linked terminal units as slave units.

The out-of-channel detectors of the base stations may perform channel availability check procedures on the possibly available alternative channels. The reports of detection of extraneous received signals may include reports of channels that have successfully passed the channel availability check procedures. The base station may store target channel parameters of channels that have successfully passed the channel availability check procedures.

The wireless communication system may also include at least one detection node having at least one receiver element that monitors operational and/or possibly alternative available communication link channels of the base stations for detecting extraneous received signals. The detection node may provide to the base stations reports of the availability of the channels it monitors for communication links. The detection node may provide the reports to the base station controller, which provides the reports to the base stations. In some embodiments, the detection node functions as a base station communicating with terminal units in one operational mode, and functions in another operational mode to monitor possibly alternative available communication link channels of the base stations for the base stations when it is not operating as a base station itself. The detection mode may have only a single receiver element.

If the base stations select the target channel parameters autonomously, instead of them being allocated by the base station controller, there would be a risk of two or more base stations changing to the same alternative channel, creating race conditions. This may be undesirable in relatively complex systems, but may be acceptable in relatively simple systems with few base stations. Some embodiments of the invention provide a wireless communication system comprising one or more base stations, a plurality of remotely located terminal units and at least one detection node. The base stations and the remotely located terminal units comprise respective communication modules for transmitting and receiving data over operational wireless communication links between at least the base stations and the terminal units. The communication modules include respective in-channel receiver elements for signals received over the operational communication links. At least a plurality of base stations include respective in-channel detectors and out-of-channel detectors for detecting extraneous received signals. The detection node includes an out-of-channel detector for detecting extraneous received signals. The in-channel detectors analyse signals from the communication modules in the base stations received over operational communication links. The out-of-channel detectors include respective out-of-channel receiver elements that monitor possibly available channels alternative to the respective operational communication link channels for detecting extraneous received signals. The base stations and the detection node provide reports of detection of extraneous received signals from the in-channel detectors and out-of-channel detectors. The base stations register whether channels are available or not for communication links and store respective target channel parameters including frequencies available for operational and alternative communication links.

These and other aspects of the embodiments described herein will be apparent from the following description of embodiments thereof. In this respect, it is to be understood that the disclosed embodiments are not limited in application to the details of construction, to the arrangements of the components and to the functioning set forth in the following description or illustrated in the drawings. The exemplary embodiments of the present disclosure are capable of other embodiments and of being practised and carried out in various ways. Also, it is to be understood that the phraseology and terminology employed herein are for the purpose of description and should not be regarded as limiting.

BRIEF DESCRIPTION OF THE DRAWINGS

Further details, aspects and embodiments will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
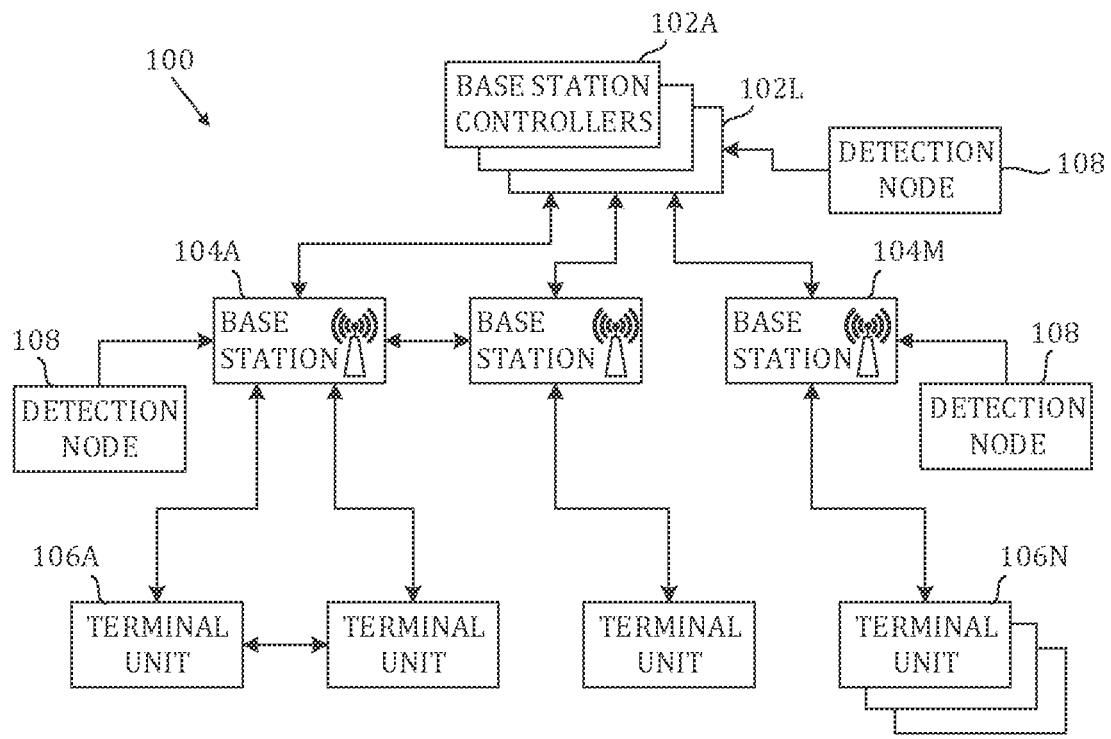
FIG. 1 is a schematic block diagram of elements in a wireless communication system in accordance with an embodiment of the invention, given by way of example.

FIG. 1 of the drawings illustrates a communication system 100 that may be configured to provide communications between one or more base station controllers 102A to 102L, one or more base stations 104A to 104M and/or one or more network connected devices or terminal units 106A to 106N.

The base station controllers 102A to 102L may be implemented for example as a network manager for managing communications in a network environment.

The elements that may be transmitting or receiving data may generically be referenced as devices, which would include at least the terminal units 106A to 106N, base stations 104A to 104M and the base station controllers 102A to 102L but may also be other elements capable of transmitting or receiving data. Some embodiments of the invention include detection nodes 108, described below.

The communication system 100 may be operable such that terminal units 106A to 106N are able to communicate with one another in addition to communicating with one or more centralized systems, including the base stations 104A to 104M and/or the base station controllers 102A to 102L, and/or one or more network managers. The system 100 may be operable to provide communications in a point-to-point arrangement, a point-to-multipoint arrangement, and/or a multipoint-to-multipoint arrangement.

As indicated in FIG. 1, the communication links in the system 100 are not necessarily established in a hierarchical fashion. Communication links may be formed also between devices that perform similar functions, such as between terminal units 106A to 106N, base stations 104A to 104M or base station controllers 102A to 102L. Certain communication links may be implemented using various wired technologies, in addition to links implemented using wireless communication technologies.

The wireless links in the system 100 may operate through a variety of transmission media. The wireless links may communicate using, for example, electromagnetic waves (radio waves, microwaves, infrared, light, laser, lidar, terahertz radiation), sound, or any transmission medium that may be utilized for wireless communications. The system may further be operable in more than one transmission media.

The communication system 100 may be configured to enable communications by provisioning and allocating one or more communication links for communications by the devices. The communication system 100 may also be configured to utilize various technologies and/or arrangements to use the limited spectrum bandwidth more efficiently. Each link may be provisioned based on various factors, such as using various frequency ranges, timeslots and tiles. Each of these links may have the same or different characteristics, such as bandwidth, latency, traffic congestion or modulation scheme.

Frequencies used by various communication links may or may not be adjacent to one another, depending on the particular embodiment and configuration. The frequency ranges may be selected and the system 100 may operate such that the system operates within various standards and may co-exist with other users of communications frequencies, such as television broadcasters, mobile telephones and radar. These standards may vary from jurisdiction to jurisdiction. There may be regulatory requirements to co-exist "politely" with other users of spectrum.

The communication links may be used for transmitting or receiving information data and control data, and one or more communication links may also be utilized for emergency, monitoring or diagnostic purposes. The wireless communication system 100 may be configured to adapt to interference or other issues by, for example, changing communication channels for communications, resizing communication links, applying filters, employing error checking, employing spatial/frequency techniques and in particular by changing channel parameters including frequencies in response to detection of extraneous received signals. The wireless communication system 100 is described herein with frequent reference to radar signals as extraneous received signals but it will be appreciated that the system 100 can also be used to detect and adapt to other extraneous received signals.

The communication links may be allocated, repurposed and/or re-sized and the system 100 may benefit from increased flexibility in ease of use and deployment, and when scaling up/down existing deployments. The capacity of the system may be altered by altering tile characteristics, such as pilots, forward error correction, for various reasons, such as taking into consideration the characteristics (physical and spectral) of the environment. The system may be designed for indoor and/or outdoor use.

Figure 2:
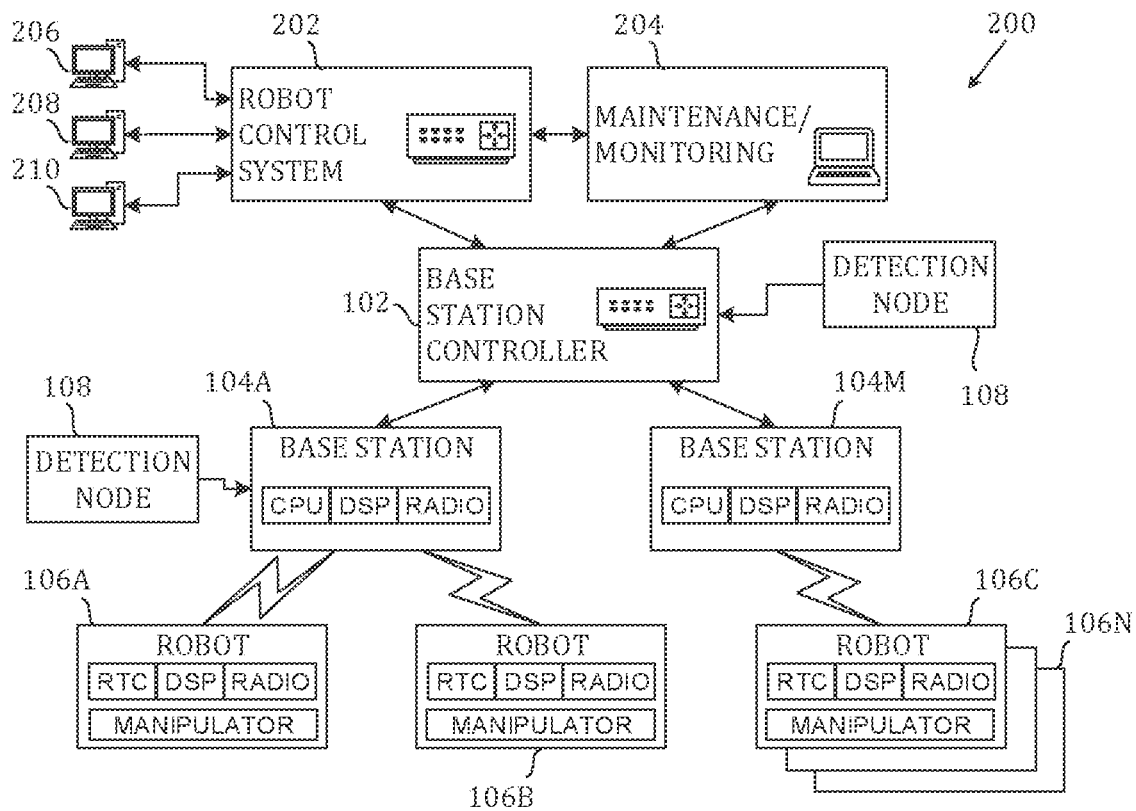
FIG. 2 is a schematic block diagram of an example of a warehouse management system including the wireless communication system of FIG. 1.

FIG. 2 illustrates an example of application of the wireless communication system 100 to a warehouse facility 200 with one or more robots including the terminal units 106A to 106N for placing objects in and picking objects from the bins. Movements of the robots may be enabled across various paths, some of which may intersect. For example the warehouse facility 200 may include bins arranged for example in a grid-like structure, where the robots move within the warehouse facility to perform various tasks. Other non-robot devices may also be terminal units, for example, a human could carry around a terminal unit for communication. Additional detection nodes 108 may provide reports relating to detection of extraneous received signals to base stations 104A to 104M, as shown in FIG. 2, or to the base station controllers 102A to 102L, over suitable wired or wireless links.

The communication system in the warehouse facility 200 may be configured to provide a bandwidth efficient radio control system for robots/terminal units that operate on an X, Y grid of approximate 60×120 meters, for example. Each grid can have many hundreds of robots and there can be several grids in a warehouse. In one example, the system is configured using base stations 104A to 104M providing point to multipoint communications using Time Division Duplex (TDD) to separate the uplink and downlink and Time Division Multiplex (TDM) and Frequency Division Multiplex (FDM) to subdivide the time frequency space to allow for a number of narrow bandwidth connections between the base stations and the terminals/robots.

The transmitters of the base stations may use additional puncturing in the transmit (Tx) sub frame (erasing of Tx bits to enable listening) for detection of radar signals, noise or interference from other sources, by listening for and detecting energy in inactive tiles in the Tx sub-frame.

The warehouse facility 200 may include a robot control system 202, a maintenance/monitoring system 204, one or more warehouse management systems (WMS) 206, order management systems 206 and one or more information management systems 208. The wireless communication links of the warehouse facility 200 may be based on broadband Wi-Fi, which enables real-time or near real-time wireless communication between the base stations 104A to 104M and the terminal units 106A to 106N of the robots.

The warehouse management system 206 may contain information such as items required for an order, stock keeping units in the warehouse, expected/predicted orders, items missing on orders, when an order is to be loaded on a transporter, expiry dates on items, what items are in which container, and whether items are fragile or big and bulky, for example.

The robot control system 202 may be configured to control the navigation/routing of robots, including moving from one location to another, collision avoidance, optimization of movement paths and control of activities to be performed, for example. The robot control system 202 may be configured to send control messages to robots, receive one or more updates from robots, and otherwise communicate with robots using a real or near-real time protocol through their terminal units 106A to 106N, the base stations 104A to 104M and the base station controllers 102A to 102L. The robot control system 202 may receive information indicating robot location and availability from the base station controller 102.

The maintenance/monitoring system (MMS) 204 may be configured to provide monitoring functions, including receiving alerts from the robots/terminal units 106A to 106N and the base stations 104A to 104M and establishing connections to query the robots. The MMS 204 may also provide an interface for the configuration of monitoring functions. The MMS 204 may interact with the Robot Control System 202 to indicate when certain robots should be recalled, or determine when an issue with the system has arisen, such as many clearances having been withdrawn, many paths having failed to resolve, or a number of idle robots beyond a predetermined number.

The robots/terminal units 106A to 106N may include respective real-time controllers (RTC), digital signal processors (DSP) and radio modules, as well as one or more manipulators for handling objects. The base stations 104A to 104M may include respective central processor units (CPU), DSP and radio modules.

The base station controllers 102A to 102L may store master routing information to map the robots, the base stations, and the grids, and are configured to manage dynamic frequency selection and frequency allocation of the base stations 104A to 104M. Dynamic frequency selection (DFS), in some embodiments, may be handled by specific receiver elements, described in more detail below, that monitor channels for detecting extraneous received signals, and may be part of a dedicated DFS radio frequency chain.

The base stations 104A to 104M may be organized as a pool of base stations, which may then be configured to be active, on standby or to monitor the system. Messages may be routed through the communication system 100 to and from the robots/terminal units 106A to 106N, such as those falling under IEEE wireless standard 802.11, and through fixed links with wired communication, for example Ethernet, to and from the base station controllers 102A to 102L and from any detection nodes 108. The base stations 104A to 104M can each signal to the robots/terminal units 106A to 106N linked to that base station to cease transmission prior to the base station ceasing its own transmission, to change the operating frequency as instructed by the base station controllers 102A to 102L, and inform the robot/terminal units 106A to 106N of a frequency or other channel change using a broadcast communication link.

Figure 3:
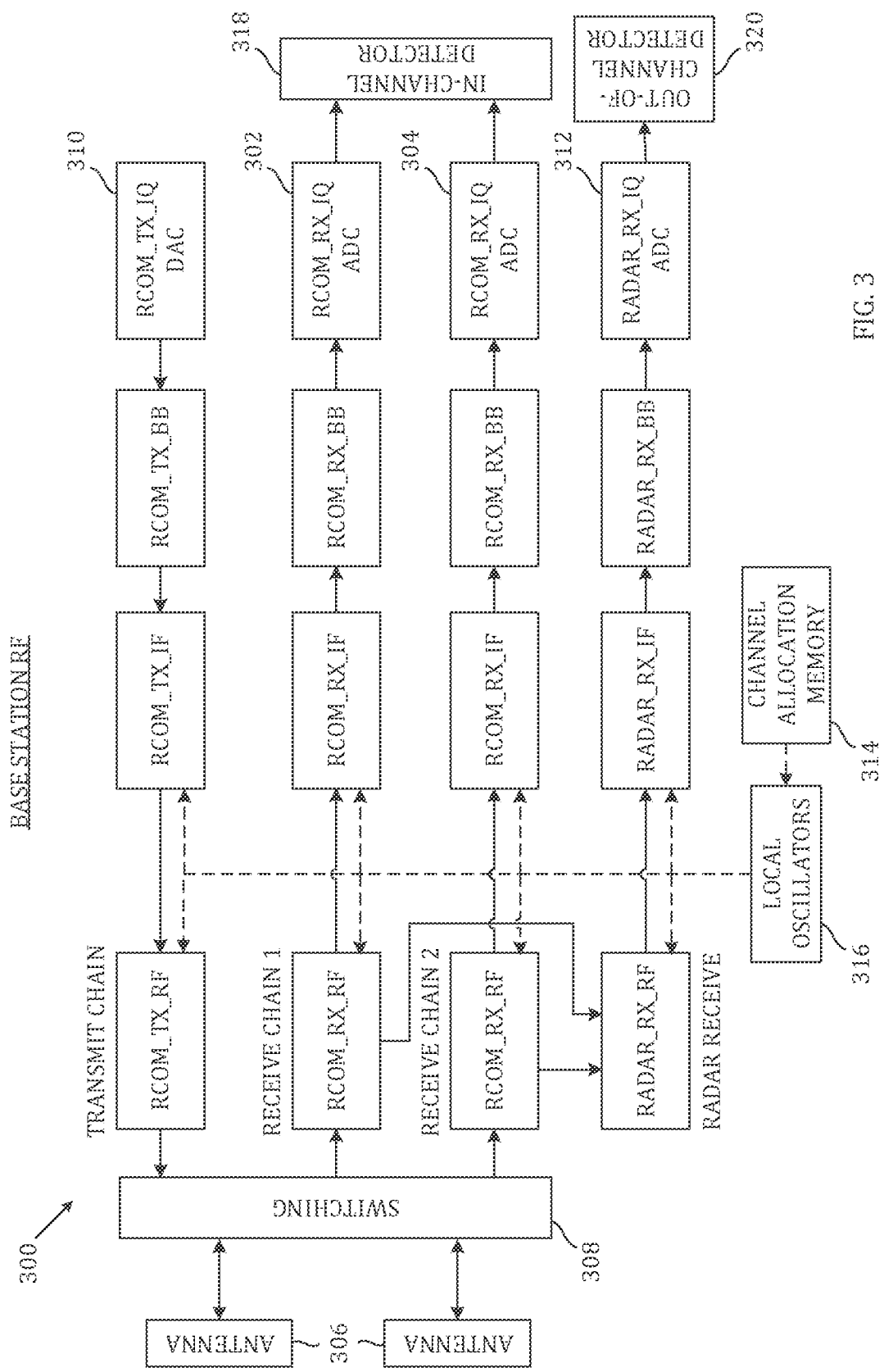
FIG. 3 is a schematic block diagram of an example of a base station in the wireless communication system of FIG. 1.

FIG. 3 illustrates an example of a base station 300 in the wireless communication system 100, which may have several similar bases stations. The system illustrated is a point to multipoint communications system operating in the unlicensed 5470 to 5725 MHz frequency band, but it will be appreciated that other frequency bands may be used and that a system can use two or more non-adjacent frequency bands. The base station 300 uses a 10 MHz bandwidth communication link allocation and may be configured to connect in a time division duplex (TDD) and/or a time division multiple access (TDMA) technique to a number of terminal units in a real or near real time manner.

The base station 300 has a communication module for transmitting and receiving data. The communication module comprises two in-channel receiver chains 302 and 304 operating in parallel for receiving data signals over the operational communication links from antennae 306 and a switching module 308, a transmitter chain 310 and an out-of-channel receiver chain 312 for monitoring signals received in channels different from the channels used by the receiver chains 302 and 304. A base station may comprise only a single in-channel receiver chain respectively, but the use of two in-channel receiver chains 302 and 304 in the base station, as shown, reduces the statistical risk of the antennas for both RF chains being both located in a local null caused by destructive interference in the multipath environment of a warehouse. In this example, the receiver chains 302, 304 and 312 are dual conversion super heterodyne receiver elements having a front end amplifier and filter with a RF frequency of 5470 to 5725 MHz, a first down conversion to IF frequency and a final down conversion to in-phase and quadrature (IQ) baseband. The transmitter chain 310 has similar up conversion elements for generating the transmitter signal. The communication module of the base station 300 includes a channel allocation memory 314 that stores parameters defining the channels used by the different chains of the communication module, as well as target channel parameters for alternative channels allocated by the base station controller 102, enabling a rapid change of channel in the case of detection of an extraneous received signal in the operating channel, or of a change of operational channel allocation. The channel allocation memory 314 pilots local oscillators 316 supplying the down conversion and up conversion frequencies.

The communication module of the base station 300 includes an in-channel detector 318 that analyses signals from the receiver chains 302 and 304 received over operational communication links for detecting extraneous received signals. An out-of-channel detector 320 analyses baseband signals received by the out-of-channel receiver chain 312 in channels different from the operating channels used by the receiver chains 302 and 304 for detecting extraneous received signals. In this example the detectors 318 and 320 are used for detecting radar signals and ensuring compliance with the regulations by dynamic frequency selection (DFS), and changing the channel parameters including the frequencies to avoid the interference with the radar transmissions. The out-of-channel detector 320 performs channel availability check (CAC) procedures on the possibly available alternative channels. The detectors 318 and 320 may also be used to detect interference by noise, or by communication signals from adjacent devices and avoid the interference with the reception of the wireless communication system 100 and may perform clear channel assessment procedures on the operating and possibly available alternative channels. The detectors 318 and 320 send signals to the base station controller 102 forming reports of detection of extraneous received signals. The reports also include reports of channels that have successfully passed the channel availability check and clear channel assessment procedures. Channel availability check and clear channel assessment procedures are specified in certain standards and it will be appreciated that embodiments of the invention may use procedures specified in the standards, and future evolutions of the standards, and may use other procedures that are non-compliant.

The base station 300 as master unit controls the channel parameters for the communication links with linked terminal units as slave units. The terminal units 106A to 106N may have receiver chains, transmitter chains, antennae and switching elements similar to the corresponding elements of the base station 300, the channel parameters used by the terminal units being set by the linked base station 300. The terminal units 106A to 106N may also detect extraneous received signals and may also have an out-of-channel receiver chain, an in-channel detector that analyses signals from the operational receiver chains and an out-of-channel detector that analyses signals received in other channels for detecting extraneous received signals, detection being reported to the base station controller 102 through the linked base station 300.

Figure 4:
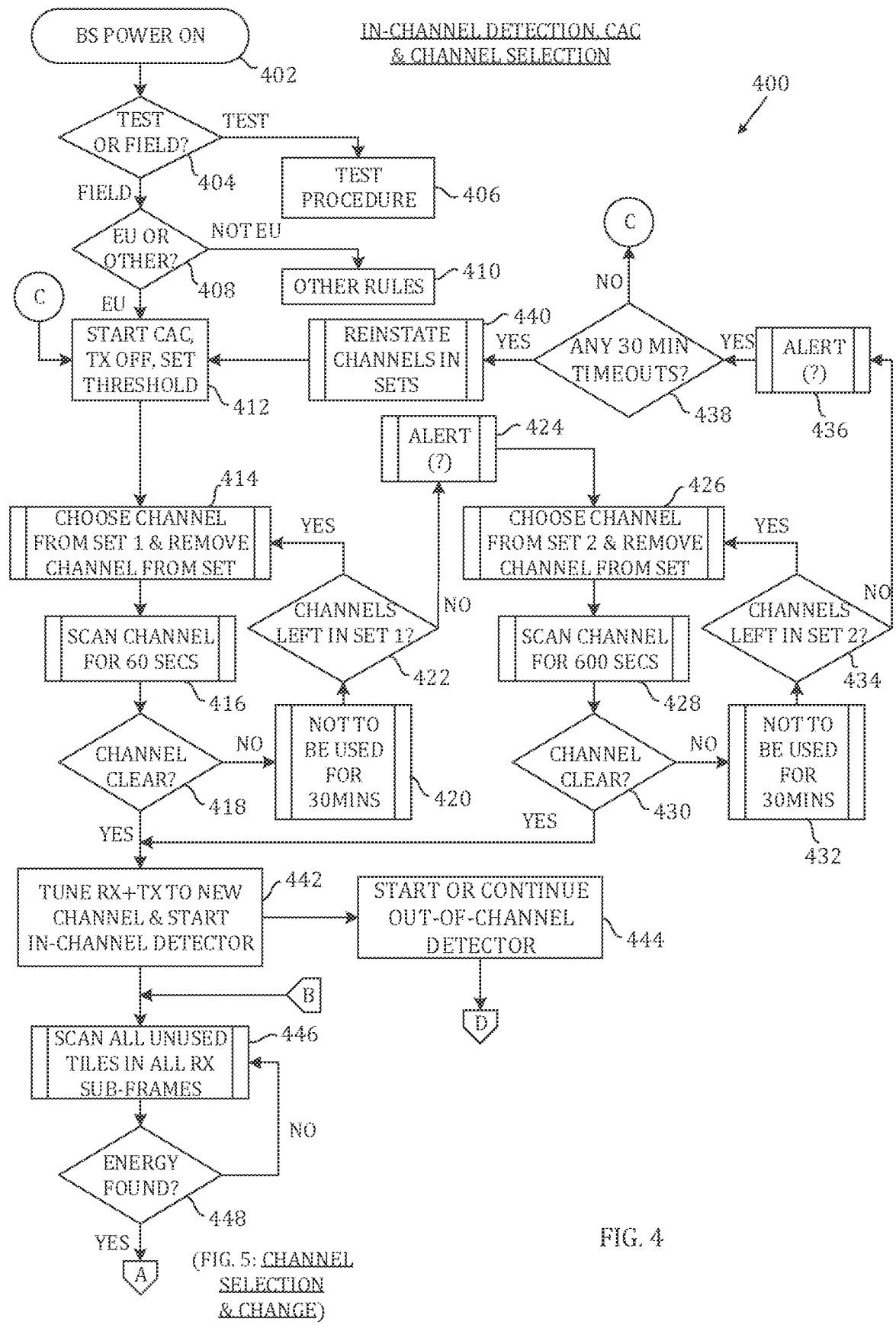
FIG. 4 is a flow chart of an example of a process of starting wireless communication, in-channel detection of extraneous received signals and channel selection in the base station of FIG. 3.
Figure 5:
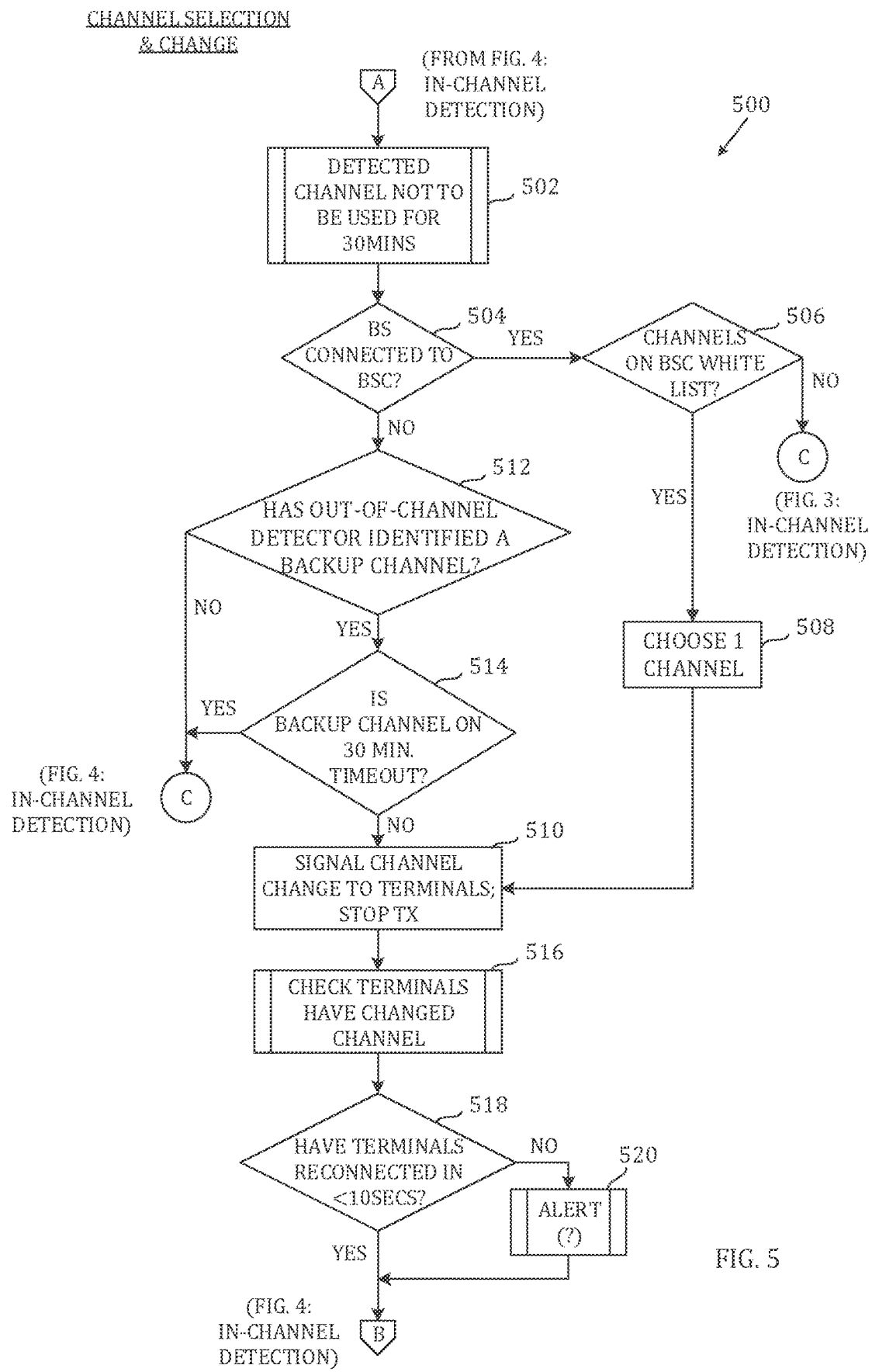
FIG. 5 is a flow chart of an example of a process of selecting and changing channel in the event of detection of extraneous received signals in the base station of FIG. 3.
Figure 6:
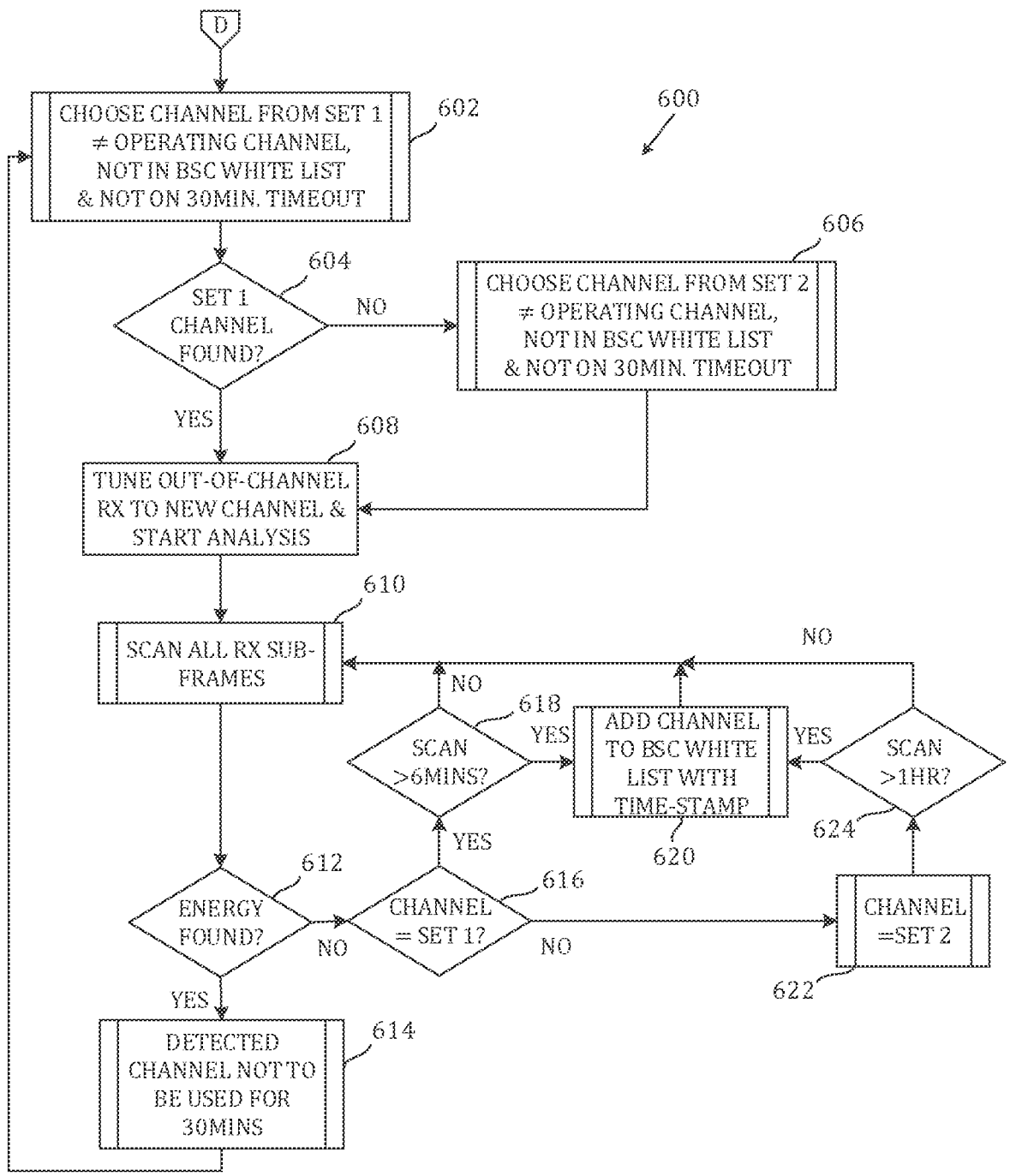
FIG. 6 is a flow chart of an example of a process of out-of-channel detection of extraneous received signals and channel availability check in the base station of FIG. 3.

FIGS. 4 to 6 illustrate, by way of example, a process ensuring compliance with regulations governing avoidance of radar signals by dynamic frequency selection (DFS) in the wireless communication system 100. FIG. 4 illustrates an example of a procedure 400 of in-channel detection of radar signals, FIG. 5 illustrates an example of a radar avoidance procedure 500 of changing the channel parameters including the frequencies used to avoid the interference with the radar transmissions, and FIG. 6 illustrates an example of a procedure 600 of out-of-channel detection of radar signals. In the European Union (EU), relevant regulations from the European Telecommunications Standard Institute (ETSI) are set out in the documents EN301893, "Broadband Radio Access Networks (BRAN); 5 GHz high performance RLAN; Harmonized EN covering the essential requirements of article 3.2 of the R&TTE Directive", and EN3004401, "Electromagnetic compatibility and Radio spectrum Matters (ERM); Short range devices; Radio equipment to be used in the 1 GHz to 40 GHz frequency range; Part 1: Technical characteristics and test methods". In USA, relevant regulations are set out in the document of the Federal Communications Commission (FCC) "CFR47, Part 15, sections C and E". These documents set out regulatory requirements for both normal operation and use, referred to as field operation, and for testing in specified configurations and conditions, referred to as test operation. The operation of the wireless communication system is described below with reference to field operation, the test operation being similar, apart from differences caused by the specified test configurations and conditions. The regulations define channel numbers ($n=5482.5+n*10$) MHz, where n is an integer from 0 to 23.

The channels are divided into two sets: set1 is channel numbers 0 to 11 and 18 to 23 and set2 is channel numbers 12 to 17. The operational requirements for set2 are more stringent than for set1.

Under EU regulations, on power up a base station (BS) must check a potential channel by the channel availability check (CAC) procedure for 60 seconds minimum if the channel is in set1 and 600 seconds if the channel is in set2. Set1 channels are to be checked first. If radar is not detected in the channel, this channel becomes the operating channel and the in-channel detector 318 continues to monitor continuously for radar detection. If radar is detected on the operating channel the wireless communication system 100 is to switch channel, if one is available. If none is available then transmission in that channel is to cease within a specified maximum time and another channel is to be checked using CAC. Any channels that are found to have radar present must not be used for 30 minutes by any of the BSs or the terminal units in the wireless communication system 100.

The out-of-channel detector 320 monitors all channels other than the operating channel on a cyclical basis, starting with channels only from set1, and for a minimum duration of 6 minutes for each channel. After checking set1 channels, if the out-of-channel detector 320 monitors set2 channels it checks each set2 channel for a minimum duration of 1 hour.

The base station controller (BSC) 102 receives signals reporting the results of the CACs from all the base stations, including any results from the terminal units. The BSC 102 registers all channels that have been checked for more than the minimum duration (white list) and without any BS detecting a radar signal. The BSC 102 also registers all channels that any BS has detected radar in (black list). The BSC 102 allocates channels only from the white list to the base stations for the operating communication links and also for the channels to be monitored by the out-of-channel detector 320 in this example. In another example of operation of an embodiment of the invention, the BS 104A to 104M select, at least in part autonomously, the channels to be monitored by the out-of-channel detector 320. Detection of radar in any channel in the white list transfers the channel immediately to the black list and the BSC 102 allocates a change to a new channel from the white list to any BS using the incriminated channel. The allocations of channels are registered in the channel allocation memory 314 of each base station, for immediate use without needing to perform the CAC procedure. In one embodiment of the invention, the base stations cease transmitting when radar is detected if no new channel is allocated by the BSC 102 as available or stored in its white list. The regulations also provide for base station operation when not connected to a base station controller, in which circumstances the base stations keep their own white lists and black lists, with updating by communication directly between the different base stations in another embodiment of the invention.

The process 400 of in-channel detection of radar signals starts at 402 with power up of the base station. At 404, the process 400 branches and if the communication system 100 is being tested the system follows the procedure 406 set out in the relevant regulations for testing. When the system is being used in field operation, the process 400 branches again at 408 and is described below if the system is operating according to EU regulations, the process 400 following generally similar procedures 410 with different parameters for other regulations.

Under EU regulations at 412 the base stations (BS) start the channel availability check (CAC) procedure by setting thresholds for minimum levels of detection of radar signals, with the BS transmitters OFF, the thresholds being set by the BSC 102, when the BSs are connected to the BSC, in normal field operation. At 414, the in-channel detectors 318 perform CAC on a channel allocated by the BSC 102 from channel set1, the BSC 102 removing that channel from the list of channels from set1 that can be allocated as the operating channel. The in-channel detectors 318 of the BSs check the channel for radar signals at 416 during 60 secs minimum. At 418, if a radar signal is detected in the channel, the detector sends a report signal to the BSC 102 and the BSC 102 includes the channel at 420 in the black list not to be used for at least 30 minutes by any of the BSs or the terminal units in the wireless communication system 100. At 422 the process branches and if there are any channels left in set1, the BSC 102 allocates another channel to be checked and the process 400 reverts to performing CAC on the new channel at 414. If there are no channels left in set1, the process 400 raises an alert at 424, to bring to the attention of the human operators/support staff of the system that there is an issue, and then checks set2 channels. At 426, the in-channel detectors 318 perform CAC on a channel allocated by the BSC 102 from channel set2, the BSC 102 removing that channel from the list of channels from set2 that can be allocated as the operating channel. The in-channel detectors 318 of the BSs check the channel for radar signals at 428 during 600 secs minimum. At 430, if a radar signal is detected in the channel, the detector sends a report signal to the BSC 102 and the BSC 102 includes the channel at 432 in the black list not to be used for at least 30 minutes by any of the BSs or the terminal units in the wireless communication system 100. At 434 the process branches and if there are any channels left in set2, the BSC 102 allocates another channel to be checked and the process 400 reverts to performing CAC on the new channel at 426. If there are no channels left in set2, the process 400 raises an alert at 436. The process 400 branches at 438: if there are any channels that were on the black list that have completed a duration of 30 mins without further detection of radar signals, they are re-instated in set1 or set2 at 440 and the process 400 reverts to the CAC procedure at 412. If no channels that were on the black list have completed a duration of 30 mins without further detection of radar signals, the base station that has been prevented from transmitting on its operating channel reverts to the CAC procedure at 412 without transmitting until a channel has become available and it has been allocated a channel from the white list.

If at 418 or 430 no radar signal is detected in the channel, the detector sends a report signal to the BSC 102 and the BSC 102 allocates the channel to the base station and linked terminal units as new operating channel and at 442 the base station and linked terminal units tune their transmitters and receivers to the new channel parameters. The reaction of the wireless communication system 100 to switch channels must conform to maximum timings specified in the relevant regulations. At 444, the out-of-channel detector 320 starts monitoring all channels other than the operating channel on a cyclical basis, according to the process 600 described below with reference to FIG. 6. The in-channel detector 318 continues to monitor continuously for radar signal detection at 446 and can monitor for radar signals even in slots where it is transmitting itself, during tiles which it is not using. If energy is found at 448 corresponding to a radar signal, the detector sends a report signal to the BSC 102 and the wireless communication system 100 starts the radar avoidance procedure 500 illustrated in FIG. 5.

The radar avoidance procedure 500 starts by the base stations and the BSC 102 including the channel at 502 in the black list not to be used for at least 30 minutes by any of the BSs or the terminal units in the wireless communication system 100. This is performed by the BSC 102 if at 504 the connections of the base stations to the BSC 102 are established. However certain regulations specify test procedures with the base stations disconnected from the BSC. If at 504 the base stations are connected to the BSC 102, and if at 506 a backup channel is available on the white list, the BSC 102 chooses at 508 a channel to allocate to the base station at 510. If at 506 no backup channel is available on the white list, the base station that has been prevented from transmitting on its operating channel reverts to the CAC procedure at 412 (FIG. 4) without transmitting until a channel has become available.

If at 504 the base stations are not connected to the BSC 102, the procedure relies on white and black lists registered in the base stations themselves on detection by themselves or by linked terminal units or by other base stations through connections directly between the base stations. If at 512 the out-of-channel detectors 320 have identified no backup channel available, or if at 514 a backup channel would be available but is still on 30 min. timeout, the base station that has been prevented from transmitting on its operating channel reverts to the CAC procedure at 412 without transmitting until a channel has become available. If a channel is allocated to the base station at 510, the base station signals to the linked terminal units to change channel and then stops its transmission. At 516 the base station checks whether the linked terminal units have reconnected to the new channel within less than 10 secs. If so, at 518 the base station and linked terminal units tune their transmitters and receivers to the new channel parameters at 442 (FIG. 4). If at 516 one or more linked terminal units have not reconnected to the new channel within less than 10 secs, an alert is raised at 520. The alert is raised to ease operation of the system and to make the operations staff aware of an issue. Now that the BS has moved to a new channel, the terminal units will not transmit until they have re-tuned their receivers and successfully decoded broadcast traffic from the BS, sometimes referred to as listen before speak.

The procedure 600 of out-of-channel detection of radar signals starts at 602 with the BSC 102 (if connected, otherwise the base station chooses a white list channel) allocating a channel from set1 that is different from the operating channel of that base station, is not already on the white list and is not subject to 30 min. timeout. If at 604 no channel from set1 with these criteria exists, a channel from set2 is allocated at 606. The radar receiver 312 and out-of-channel detector 320 are tuned to the allocated channel at 608 and start detection and analysis. All the receiver sub-frames in the allocated channel are scanned at 610 for radar signals (or interference), since no data is being transmitted in this channel. If energy is found at 612, the detector sends a report signal to the BSC 102 and the BSC 102 includes the channel at 614 in the black list not to be used for at least 30 minutes by any of the BSs or the terminal units in the wireless communication system 100 and the procedure 600 reverts to 602 with the BSC 102 allocating a channel. If at 616 the channel monitored by the out-of-channel detector 320 is from set1, and if the channel has been monitored for 6 mins, the detector 320 sends a report signal to the BSC 102 and the BSC 102 includes the channel at 620 in the white list. If at 622 the channel monitored by the out-of-channel detector 320 is from set2, and if the channel has been monitored for 1 hour, the detector 320 sends a report signal to the BSC 102 and the BSC 102 includes the channel at 620 in the white list. Otherwise, the detector 320 continues monitoring the channel at 610.

The procedures are described above with reference to detection of radar signals. It will be appreciated that embodiments of the invention may react to detection of other extraneous signals, instead of or in addition to radar signals. The reaction may depend on the type of signal detected.

The invention may be implemented at least partially in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one, or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. The mere fact that certain measures are recited in mutually different claims does not indicate that a combination of these measures cannot be used to advantage.

The invention claimed is:

1. A wireless communication system comprising:
   a plurality of base stations; and
   a plurality of remotely located terminal units;
   the base stations and the remotely located terminal units having respective communication modules configured for transmitting and receiving data over operational wireless communication links between at least the base stations and the terminal units, the communication modules including respective in-channel receiver elements for signals received over the operational communication links; and
   at least one base station controller configured to control channel parameters used by the base stations for the respective communication links, the channel parameters including allocations of frequencies for use in the communication links,
   wherein at least a plurality of base stations include respective in-channel detectors and out-of-channel detectors for detecting extraneous received signals,
   wherein the in-channel detectors are configured to analyse signals from the communication modules in the base stations received over the operational communication links,
   wherein the out-of-channel detectors include respective out-of-channel receiver elements configured to monitor candidate available channels alternative to the operational communication links for detecting extraneous received signals,
   wherein the base station controller is configured to:
      receive reports of detection of extraneous received signals from the in-channel detectors and out-of-channel detectors;
      register whether channels are available or not for communication links; and
      allocate to the base stations respective target channel frequencies available for operational and alternative communication links,
   wherein the base stations are configured to store the respective target channel frequencies that have been checked successfully to be available for operational and alternative communication links, and
   wherein the base stations are configured to change channel parameters used for the respective operational communication links to the allocated stored target channel frequencies without additional availability checking of the alternative communication links.

2. A wireless communications system according to claim 1, wherein the base stations are configured to change channel parameters for the operational communication links to the stored channel frequencies for the alternative communication links in response to detection of in-channel extraneous received signals.

3. A wireless communications system according to claim 2, wherein the base stations are configured to change channel parameters for the operational communication links in response to the respective in-channel detector detecting extraneous received signals and to the base station controller changing allocations of frequency for the respective base stations as a function of a report from a different base station.

4. A wireless communication system according to claim 2, wherein the base stations are configured to use dynamic frequency selection techniques to change channel parameters for the operational communication links.

5. A wireless communications system according to claim 4, wherein the in-channel detectors and out-of-channel detectors are configured to detect reception of radar signals as the extraneous received signals and the dynamic frequency selection techniques are utilised for radar detection and avoidance.

6. A wireless communications system according to claim 1, wherein the base stations are configured as master units to control the channel parameters for the communication links with linked terminal units as slave units.

7. A wireless communications system according to claim 1, wherein the out-of-channel detectors of the base stations are configured to perform channel availability check procedures on the possibly available alternative channels, and the reports of detection of extraneous received signals include reports of channels that have successfully passed the channel availability check procedures.

8. A wireless communications system according to claim 1, comprising:
at least one detection node having at least one receiver element that is configured to monitor operational and/or possibly alternative available communication link channels of the base stations for detecting extraneous received signals, and that is configured to provide to the base stations reports of the availability of the channels it monitors for communication links.

9. A wireless communications system according to claim 8, wherein the detection node is configured to provide the reports to the base station controller, which provides the reports to the base stations.

10. A wireless communications system according to claim 8, wherein the detection node functions as a base station communicating with terminal units in one operational mode, and functions in another operational mode to monitor possibly alternative available communication link channels of the base stations for the base stations when it is not operating as a base station itself.

11. A base station configured for use in a wireless communications system, wherein the wireless communications system includes:
a plurality of the base stations; and
a plurality of remotely located terminal units;
the base stations and the remotely located terminal units having respective communication modules for transmitting and receiving data over operational wireless communication links between at least the base stations and the terminal units, the communication modules including respective in-channel receiver elements for signals received over the operational communication links; and
at least one base station controller configured to control channel parameters used by the base stations for the respective communication links, the channel parameters including allocations of frequencies for use in the communication links;
the base station comprising:
at least one in-channel detector and at least one out-of-channel detector for detecting extraneous received signals,
wherein the in-channel detector is configured to analyse signals from the communication modules in the base station received over channels corresponding to respective operational communication links for detecting extraneous received signals,
wherein the out-of-channel detector includes out-of-channel receiver elements that are configured to monitor candidate available channels alternative to the respective operational communication link channels for detecting the extraneous received signals, and
wherein the base station is configured to:
send to the base station controller reports of detection of extraneous received signals from the in-channel detectors and out-of-channel detectors;
register whether channels are available or not for communication links;
allocate to the base station target channel parameters including frequencies available for operational and alternative communication links;
store the respective allocated target channel frequencies that have been checked successfully to be available for alternative communication links; and
change channel parameters used for the respective operational communication links to the allocated stored target channel frequencies without additional availability checking of the alternative communication links.

12. A base station according to claim 11, wherein the base station is configured to change channel parameters for the operational communication links to the stored channel parameters for the alternative communication links in response to detection of in-channel extraneous received signals.

13. A base station according to claim 11, wherein the base station is configured to change channel parameters for the operational communication links in response to the in-channel detector detecting extraneous received signals and to the base station controller changing allocations of frequency for the respective base stations as a function of a report from a different base station.

14. A base station according to claim 12, wherein the base station is configured to use dynamic frequency selection techniques to change channel parameters for the operational communication links.

15. A base station according to claim 14, wherein the in-channel detector and out-of-channel detector are configured to detect reception of radar signals as the extraneous received signals and the dynamic frequency selection techniques are utilised for radar detection and avoidance.

16. A base station according to claim 11, wherein the base station is configured as a master unit to control the channel parameters for the communication links with linked terminal units as slave units.

17. A base station according to claim 11, wherein the out-of-channel detector is configured to perform channel availability check procedures on the candidate available alternative channels, and the reports of detection of extraneous received signals include reports of channels that have successfully passed the channel availability check procedures.

* * * * *